(12) United States Patent
Matsushita et al.

(10) Patent No.: US 7,197,414 B2
(45) Date of Patent: Mar. 27, 2007

(54) SYSTEM AND METHOD FOR IDENTIFYING A MANUFACTURING TOOL CAUSING A FAULT

(75) Inventors: Hiroshi Matsushita, Yokohama (JP); Kenichi Kadota, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 33 days.

(21) Appl. No.: 11/090,217

(22) Filed: Mar. 28, 2005

(65) Prior Publication Data

US 2005/0251365 A1 Nov. 10, 2005

(30) Foreign Application Priority Data

Mar. 29, 2004 (JP) ............................ P2004-96677

(51) Int. Cl.
*G06F 19/00* (2006.01)
(52) U.S. Cl. .......................... 702/83; 702/83; 700/121; 438/14
(58) Field of Classification Search ................. 702/83, 702/84; 700/121; 438/14
See application file for complete search history.

(56) References Cited

U.S. PATENT DOCUMENTS 5,621,665 A * 4/1997 Ghosh et al. ................. 702/84
2002/0193891 A1* 12/2002 Ushiku ........................ 700/21
2003/0011376 A1 1/2003 Matsushita et al.
2003/0028279 A1* 2/2003 Wang et al. ................. 700/121
2004/0049722 A1 3/2004 Matsushita
2004/0255198 A1 12/2004 Matsushita et al.
2005/0021303 A1 1/2005 Matsushita et al.

OTHER PUBLICATIONS

Matsushita et al.; "Highly Sensitive Inspection System for Lithography-Related Faults in Agile-Fab—Detecting Algorithm for Monitoring and Evaluation of Yield Impact"; IEEE Transactions on Semiconductor Manufacturing, vol. 15, No. 4, pp. 506-512, (2002).
Matsushita et al.; "Failure Detection System, Failure Detection Method, and Computer Program Product"; U.S. Appl. No. 10/784,819, filed Feb. 24, 2004.

* cited by examiner

*Primary Examiner*—Marc S. Hoff
*Assistant Examiner*—Janet L Suglo
(74) *Attorney, Agent, or Firm*—Finnegan, Henderson, Farabow, Garrett & Dunner, L.L.P.

(57) ABSTRACT

A system for identifying a manufacturing tool causing a failure, includes a data generating module generating factorial effect data, based on information on a failure lot group by using an orthogonal array, a chart generating module generating a factorial effect chart based on the factorial effect data, a selection module selecting failure lots caused by the same reason for a failure from among the failure lot group, based on the factorial effect chart, and an identification module identifying a manufacturing tool used as a common tool for the selected plurality of failure lots, based on history information of the manufacturing tool group.

19 Claims, 11 Drawing Sheets

| PROCESS NUMBER | $X^2$ TEST VALUE Pq |
|---|---|
| 126 | 0.13 |
| 76 | 0.26 |
| 93 | 0.39 |

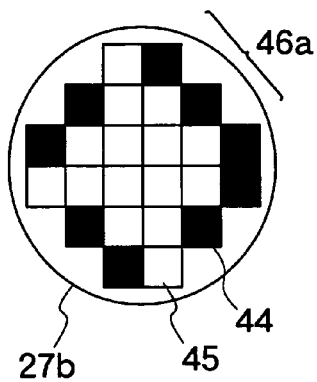 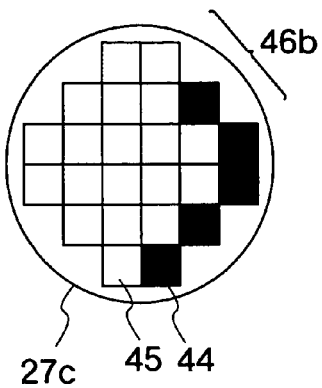 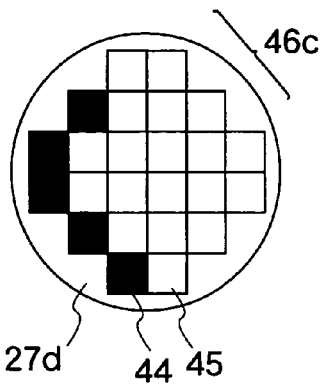
FIG. 4A    FIG. 4B    FIG. 4C
FIG. 5
|  | \multicolumn{11}{c}{FACTOR NUMBER} |
|---|---|---|---|---|---|---|---|---|---|---|---|
|  | 1 | 2 | 3 | 4 | 5 | 6 | 7 | 8 | 9 | 10 | 11 |
| 1 | 1 | 1 | 1 | 1 | 1 | 1 | 1 | 1 | 1 | 1 | 1 |
| 2 | 1 | 1 | 1 | 1 | 1 | 2 | 2 | 2 | 2 | 2 | 2 |
| 3 | 1 | 1 | 2 | 2 | 2 | 1 | 1 | 1 | 2 | 2 | 2 |
| 4 | 1 | 2 | 1 | 2 | 2 | 1 | 2 | 2 | 1 | 1 | 2 |
| 5 | 1 | 2 | 2 | 1 | 2 | 2 | 1 | 2 | 1 | 2 | 1 |
| 6 | 1 | 2 | 2 | 2 | 1 | 2 | 2 | 1 | 2 | 1 | 1 |
| 7 | 2 | 1 | 2 | 2 | 1 | 1 | 2 | 2 | 1 | 2 | 1 |
| 8 | 2 | 1 | 2 | 1 | 2 | 2 | 2 | 1 | 1 | 1 | 2 |
| 9 | 2 | 1 | 1 | 2 | 2 | 2 | 1 | 2 | 2 | 1 | 1 |
| 10 | 2 | 2 | 2 | 1 | 1 | 1 | 1 | 2 | 2 | 1 | 2 |
| 11 | 2 | 2 | 1 | 2 | 1 | 2 | 1 | 1 | 1 | 2 | 2 |
| 12 | 2 | 2 | 1 | 1 | 2 | 1 | 2 | 1 | 2 | 2 | 1 |
TRIAL NUMBER (rows 1–12)
「1」: FAILURE LOT
「2」: PASS LOT

FIG. 6

| PROCESS NUMBER | TOOL NUMBER | TEST VALUE | | | |
|---|---|---|---|---|---|
| | | TRIAL NUMBER = 1 | TRIAL NUMBER = 2 | | TRIAL NUMBER = 12 |
| 126 | 2 | 0.13 | 0.19 | ---- | 0.03 |
| 76 | 1 | 0.26 | 0.33 | | 0.15 |
| 93 | 2 | 0.39 | 0.04 | | 0.18 |
| 42 | 3 | 0.41 | 1 | | 1 |

FIG. 7A

| TRIAL NUMBER | FAILURE LOT ID |
|---|---|
| 1 | #1345、#2316、#2684、・・・・、#3671 |
| 2 | #1345、#2316、#2684、#2873、#2954 |
| | |
| 12 | #2684、#2873、・・・・、#3671 |

FIG. 7B

TRIAL NUMBER = 1

| PROCESS NUMBER | TOOL NUMBER | TEST VALUE |
|---|---|---|
| 126 | 2 | 0.13 |
| 76 | 1 | 0.26 |
| 93 | 2 | 0.39 |
| 42 | 3 | 0.41 |

53a →

TRIAL NUMBER = 2

| PROCESS NUMBER | TOOL NUMBER | TEST VALUE |
|---|---|---|
| 93 | 2 | 0.04 |
| 214 | 4 | 0.11 |
| 126 | 2 | 0.19 |
| 76 | 1 | 0.33 |

53b →

TRIAL NUMBER = 12

| PROCESS NUMBER | TOOL NUMBER | TEST VALUE |
|---|---|---|
| 46 | 2 | 0.02 |
| 126 | 2 | 0.03 |
| 76 | 1 | 0.15 |
| 93 | 2 | 0.18 |

| PROCESS NUMBER | TOOL NUMBER | $X^2$ TEST VALUE | FAILURE LOT ID | STACK MAP |
|---|---|---|---|---|
| 93 | 2 | 0.01 | #1345<br>#2684<br>. . .<br>#2954 | |
| 126 | 2 | 0.02 | #2316<br>#2719<br>. . .<br>#3511 | |
| 76 | 1 | 0.04 | #3621<br>#3688<br>. . .<br>#3671 | |

| LOW YIELD LOT ID |
|---|
| #5423 |
| #5562 |
| #5872 |
| . . . |
| #8724 |

| TRIAL NUMBER | FAILURE LOT ID |
|---|---|
| 1 | #5423, #5562, #5872, · · · ·, #8724 |
| 2 | #5423, #5562, #5872, #5963, #6163 |
| ⋮ | ⋮ |
| 16 | #6324, #6642, · · ·, #8724 |

FIG. 15

| PROCESS NUMBER | TOOL NUMBER | $X^2$ AUTHORIZED VALUE | FAILURE LOT ID | STACK MAP |
|---|---|---|---|---|
| 103 | 4 | 0.00 | #5562<br>#5872<br>...<br>#5998 | 46h, 45, 27h, 44 |
| 46 | 1 | 0.01 | #5423<br>#5724<br>...<br>#7213 | 46i, 45, 27i, 44 |
| 197 | 6 | 0.03 | #6327<br>#6953<br>...<br>#8724 | 46j, 45, 27j, 44 |

SYSTEM AND METHOD FOR IDENTIFYING A MANUFACTURING TOOL CAUSING A FAULT

CROSS REFERENCE TO RELATED APPLICATIONS AND INCORPORATION BY REFERENCE

This application is based upon and claims the benefit of priority from prior Japanese Patent Application P2004-096677 filed on Mar. 29, 2004; the entire contents of which are incorporated by reference herein.

BACKGROUND OF THE INVENTION

1. Field of the Invention

The present invention relates to a system and a method for identifying a manufacturing tool causing a fault, which analyzes the causes of the reason for a decreased product yield in a manufacturing method and manufacturing of industrial products.

2. Description of the Related Art

A method for analyzing a location of an occurrence of a fault within a surface of a wafer will be described, using an example of a manufacturing process of semiconductor integrated circuits. In the method, the location of an occurrence of a fault within a surface of a wafer is identified, based on data in a storage tool for test results and a storage device for yield data, with respect to a substrate having a possibility of a systematic fault. By using a program, the location of an occurrence of a fault is stored in the storage device for yield data, and the information on the location of an occurrence of a fault is transmitted to an in-plane correlation analysis tool. Further, only a lot or a substrate group processed by a single tool responsible fault is selected, and a difference analysis is performed on the tool for the fault. The "tool causing fault" is a manufacturing tool responsible for product faults. Therefore, when distributions within the surfaces of clustering faults, which may be caused by a plurality of tools, have patterns similar to one another, it is difficult to distinguish the tools causing the fault from one another using only fault unit region patterns indicating the distribution of failure locations on substrates. The "clustering faults" are faults in which a certain uneven distribution of faults is observed in a wafer surface.

SUMMARY OF THE INVENTION

An aspect of the present invention inheres in a system for identifying a manufacturing tool causing a fault, including a data generating module configured to generate factorial effect data, based on information on a failure lot group, by using an orthogonal array in which a factor column contains maintenance information and operation information as to a plurality of manufacturing tool groups, and in which a trial row specifies main effect information by every combinations of levels in the factor column; a chart generating module configured to generate a factorial effect chart based on the factorial effect data; a selection module configured to select a plurality of failure lots caused by the same reason for the fault from among the failure lot group, based on the factorial effect chart; and an identification module configured to identify a manufacturing tool used as a common tool for the selected plurality of failure lots, based on history information of the manufacturing tool group.

Another aspect of the present invention inheres in a system for identifying a manufacturing tool causing a fault, including a tool database configured to store maintenance information and operation information of a plurality of manufacturing tool groups; a yield database configured to store yield information on an industrial product; a failure lot group database configured to store information on a failure lot group estimated based on a test value of a tool-difference analysis calculated using an orthogonal array in which a factor column contains failure lot identification information included in yield information stored in the yield database, and in which a trial row specifies main effect information by every combinations of levels in the factor column; a chart generating module configured to generate a factorial effect chart by using the failure lot identification information and failure lot group information stored in the failure lot group database; a selection module configured to select a plurality of failure lots caused by the same reason for the fault from among the failure lot group information, based on the factorial effect chart; and an identification module configured to identify a manufacturing tool used as a common tool for the selected plurality of failure lots, based on history information of the manufacturing tool group stored in the tool history information database.

Still another aspect of the present invention inheres in a computer implemented method for identifying a manufacturing tool causing a fault, including generating factorial effect data, based on information on a failure lot group, by using an orthogonal array in which a factor column contains maintenance information and operation information as to a plurality of manufacturing tool groups, and in which a trial row specifies main effect information by every combinations of levels in the factor column; generating a factorial effect chart based on the factorial effect data; selecting a plurality of failure lots caused by the same reason for the fault from among the failure lot group, based on the factorial effect chart; and identifying a manufacturing tool used as a common tool for the selected plurality of failure lots, based on history information of the manufacturing tool group.

BRIEF DESCRIPTION OF DRAWINGS

FIG. 4A is a schematic view showing an example of a tendency within a surface of a periphery type failure substrate, generated by the system for identifying a manufacturing tool causing fault according to the first embodiment;

FIG. 4B is a schematic view showing another example of a tendency within a surface of a periphery type failure substrate, generated by the system for identifying a manufacturing tool causing fault according to the first embodiment;

FIG. 4C is a schematic view showing still another example of a tendency within a surface of a periphery type failure substrate, generated by the system for identifying a manufacturing tool causing fault according to the first embodiment;

FIG. 5 is a schematic diagram showing an example of 2-level orthogonal array L12 to be used in the system for identifying a manufacturing tool causing fault according to the first embodiment;

FIG. 6 is a schematic diagram showing an example of test values for processes extracted by and failure lot groups selected by the system for identifying a manufacturing tool causing fault according to the first embodiment;

FIG. 7A is a schematic diagram showing failure lot groups selected based on an orthogonal array by the system for identifying a manufacturing tool causing fault according to the first embodiment;

FIG. 7B is a schematic diagram showing results obtained by performing a tool-difference analysis for every trial number by the system for identifying a manufacturing tool causing fault according to the first embodiment;

FIG. 9 is a schematic diagram showing a failure cause list where a failure lot is identified by a failure lot selection method used in the first embodiment;

FIG. 15 is a schematic diagram showing a tool causing fault list generated by the system for identifying a manufacturing tool causing fault according to the second embodiment.

DETAILED DESCRIPTION OF THE INVENTION

Figure 1:
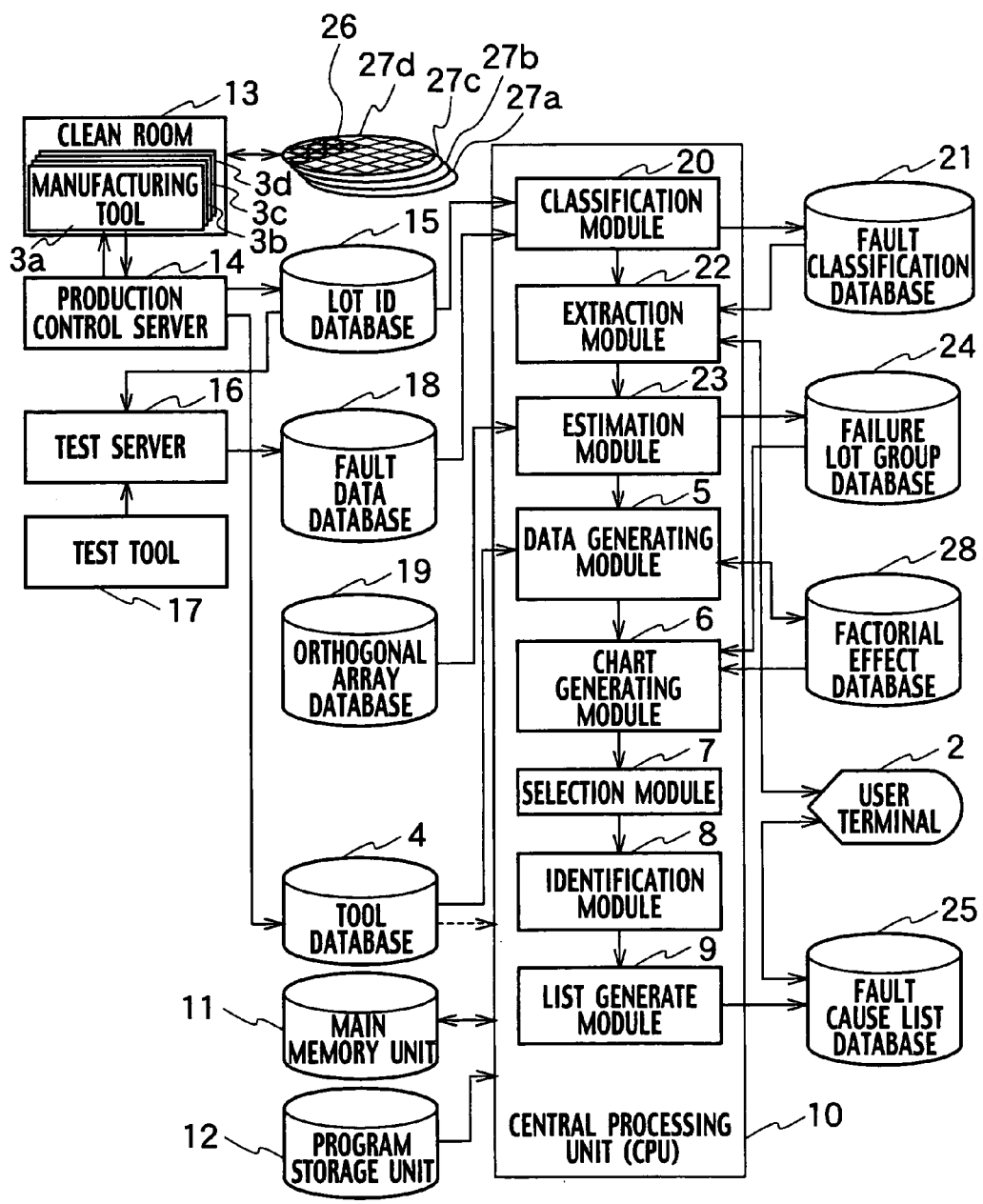
FIG. 1 is a block diagram showing a system for identifying a manufacturing tool causing fault according to a first embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. In the following descriptions, numerous specific details are set fourth such as specific signal values, etc. to provide a thorough understanding of the present invention. However, it will be obvious to those skilled in the art that the present invention may be practiced without such specific details.

As for an embodiment of the present invention, a system and a method for identifying a manufacturing tool that causes a fault will be described by taking an example of a manufacturing process for semiconductor integrated circuits as a manufacturing method for industrial products. However, the system and the method are not necessarily limited only to semiconductor integrated circuits. It is, of course, possible to apply the system and the method to a manufacturing method for industrial products, which adopts a method employing, according to predetermined processes, a plurality of manufacturing tool groups for a plurality of substrates which are divided in units of lots.

(First Embodiment)

A system for identifying a manufacturing tool causing a fault according to a first embodiment of the present invention is provided, as shown in FIG. 1, with a central processing unit (CPU) 10 which includes a data generating module 5, a chart generating module 6, a selection module 7, and an identification module 8. The data generating module 5 generates factorial effect data on the basis of information, as to a group of failure lots, by making use of an orthogonal array in which a factor column contains maintenance information and operation information as to a plurality of manufacturing tool groups $3a$, $3b$, $3c$ ... $3q$ ... ; and a trial row specifies main effect information by every combinations of levels in the factor column. The chart generating module 6 generates a factorial effect chart on the basis of the factorial effect data. The selection module 7 selects a plurality of failure lots from among the group of failure lots, each resulting from the same reason for the fault, on the basis of the factorial effect chart. The identification module 8 reads, from a tool database 4, history information on the manufacturing tool groups $3a$, $3b$, $3c$ ... $3q$ ... which processed the plurality of failure lots which the selection module 7 has selected, and identifies manufacturing tools which are common to the plurality of failure lots. The "failure lot group" is a group of failure lots where the tendencies of faults within the surfaces of substrates are the same with one another.

Moreover, the CPU 10 includes a list generating module 9, a classification module 20, an extraction module 22, and an estimation module 23. The list generating module 9 generates list information on tools causing faults, based on an analyzed result in the identification module 8.

The classification module 20 stores fault classification information in which failure lots are classified based on a failure unit region pattern, in a fault classification database 21. That is, the classification module 20 acquires lot ID information and fault data for every lot which is processed with the manufacturing tool groups $3a$, $3b$, $3c$ ... $3q$ ... for a constant period of time such as a day, a week, and a month, from a lot identification information database 15 (in FIG. 1, identification information being abbreviated as "ID"). The fault data thus acquired are classified based on tendencies of faults within the surfaces of substrates for clustering faults. Here, the "lot identification information" is information identifying a plurality of individual lots, a lot corresponding to a group of substrates including the substrates $27a$, $27b$, $27c$, $27d$ .... In addition, the classification module 20 classifies clustering faults using the results of determination a pass/fail for every chip, for fault data. The classified results are stored in the fault classification database 21 so that the results are associated with the manufacturing tool groups $3a$, $3b$, $3c$ ... $3q$ .... A user can check the classified results of clustering faults listed in a database through a user terminal 2.

The extraction module 22 reads fault classification information from the fault classification database 21, and extracts failure lot identification information based on a command inputted through the user terminal 2, for example. The failure lot identification information to be extracted includes a failure lot identification number for a lot where a periphery fault occurs, a fault end region pattern, a fault unit region pattern, and the like. For example, a lot having a tendency of faults within a substrate surface, the tendency being the same as that within a substrate surface with designated failures, is automatically extracted as a failure lot group. The extracted result is transmitted to a printer, a display, and the like for the user terminal 2, in a form in which a typical substrate map is associated with identification information on a failure lot having a tendency of failures within a substrate surface, which is the same as that for the typical substrate map.

The extraction module 22 selects a clustering failure against which measures should be taken on the basis of the classified result as to clustering failures. A method of selection is, for example, to count the frequency of occurrence of clustering failures on a lot where a periphery failure occurs, and to select a failure which occurs in a large number of lots. Alternatively, it may be possible to calculate the yield impact by multiplying the amount of reduction in yield due to the clustering failures with the frequency of occurrence, and to select a failure having a large impact on the yield as the failure against which measures should be taken. Furthermore, it may be possible for a user to select manufacturing tool groups $3a$, $3b$, $3c$ . . . $3q$ . . . causing a fault, depending on a tendency within a substrate surface for common failure unit region patterns. In that case, a user may select manufacturing tool groups $3a$, $3b$, $3c$ . . . $3q$ . . . so that the groups are associated with lots having selected failure unit region patterns.

The estimation module 23 reads an orthogonal array from an orthogonal array database 19 where main effect information is arranged on a trail row in association with a plurality of factor columns. The main effect information is used to estimate an optimum condition. The estimation module 23 estimates a failure lot group. The estimated result is transmitted to the data generating module 5, and the failure lot groups are listed in a database to be stored in a failure lot group database 24.

A system for identifying a manufacturing tool causing a failure includes a production control server 14, the tool database 4, the lot identification information database 15, a test server 16, a test tool 17, and a fault data database 18.

The production control server 14 acquires the lot identification information (ID) of the substrates $27a$, $27b$, $27c$, $27d$ . . . and the process history information on the plurality of manufacturing tool groups $3a$, $3b$, $3c$ . . . $3q$ . . . from the plurality of manufacturing tool groups $3a$, $3b$, $3c$ . . . $3q$ . . . which operate in a clean room 13. In the tool database 4, maintenance information is stored and operation information such as an operation history of the manufacturing tool groups $3a$, $3b$, $3c$ . . . $3q$ . . . which respectively correspond to the operation processes a, b, c . . . q . . . , and which are acquired by the production control server 14. The tool database 4 associates the lot identification information with the process history information, and thereafter records both kinds of information. The lot identification information is stored in the lot identification information database 15.

The test server 16 is connected to the test tool 17. For example, the test server 16 performs a probe test with the test tool 17 on a semiconductor integrated circuit which is formed on each chip region 26 of the substrates $27a$, $27b$, $27c$, $27d$ . . . . The test result is recorded in the test server 16. Furthermore, at a stage where the substrates $27a$, $27b$, $27c$, $27d$ . . . are processed in the clean room 13, the test server 16 performs a probe test with the test tool 17 on a semiconductor integrated circuit formed on the chip region 26 of each substrate. The test result is recorded as fault data in the fault data database 18. The test tool 17 is not limited to the one for the probe test, but can also be adopted, for example, for a surface testing tool for testing the surfaces of the substrates, $27a$, $27b$, $27c$, $27d$ . . . . In that case, the test tool 17 images the surfaces of the substrates $27a$, $27b$, $27c$, $27d$ . . . with a CCD camera while scanning the substrates in the upper and lower directions or in the left and right directions. Then, the test tool 17 can identify a failure portion which occurred in manufacturing processes, and transmit the test result. The test server 16 reads process history information on each substrate, from the lot identification information database 15, which is stored so that it is associated with lot identification information for the substrates $27a$, $27b$, $27c$, $27d$ . . . . The test server 16 can then store, in the fault data database 18, the process history that it is associated with the test result. The fault data database 18 stores the test result to be transmitted by the test tool 17 as fault data listed in a database. The fault data database 18 stores the test result and a failure unit region pattern of a substrate so that they are associated with the lot identification information.

Manufacturing tool groups $3a$, $3b$, $3c$ . . . $3q$ . . . are, for example, those forming a manufacturing line for semiconductor products, which operate in the clean room 13. To be specific, the manufacturing tool groups are those required in a series of processes for fabricating a semiconductor integrated circuit on a chip region 26 of a substrate. The tool groups may include an aligner, an oxidation furnace, a diffusion furnace, an ion implanter, a chemical vapor deposition (CVD) system, sputtering equipment, a vacuum evaporation system, heating equipment, etching equipment, cleaning equipment, and the like.

In addition, the system for identifying a manufacturing tool causing a failure shown in FIG. 1, includes the orthogonal array database 19 and the fault classification database 21. The orthogonal array database 19 stores orthogonal array data which provide the same effect as that given by a multi-way layout in which a combination of all levels of some factors is created, to the levels of some factors. In the "orthogonal array," main effect information for estimating an optimum condition is allocated on a trial row in association with a plurality of factor columns. As to the main effect information for estimating an optimum condition for the orthogonal array, estimation information specified by "1" and "2" for differentiating a pass lot and a failure lot for the substrates is allocated on a matrix. For example, the level "1" is assigned to a failure lot, while the level "2" is assigned to a pass lot.

As for the orthogonal array, there is a two level orthogonal array and a three level orthogonal array. Examples of the two level orthogonal arrays are orthogonal array L4, L8, L12 or L16. The orthogonal array L4 allows layout of up to three factors of two levels, and specifies the experiment conditions (trials) in four combinations of factors. The orthogonal array L8 allows layout of up to seven factors of two levels, and specifies the trials in eight combinations of factors. The orthogonal array L12 allows layout of up to eleven factors of two levels, and specifies the trials in twelve combinations of factors (See FIG. 5). The orthogonal array L16 allows layout of up to fifteen factors of two levels, and specifies the trials in sixteen combinations of factors. Examples of the three level orthogonal arrays are orthogonal array L9, L18, L27, or L36. The orthogonal array L9 allows layout of up to four factors of three levels, and specifies the trials in nine combinations of factors. The orthogonal array L18 allows layout of up to eight factors (two levels×1, three levels×7), and specifies the trials in eighteen combinations of factors. The orthogonal array L27 allows layout of up to thirteen factors of three levels, and specifies the trials in twenty-seven combinations of factors. The orthogonal array L36 allows layout of up to twenty-three factors (two levels×11, three levels×12), and specifies the trials in thirty-six combinations of factors. The orthogonal arrays L12, L18, and L36 can be used as variance types of the orthogonal array where an interaction effect fails to appear on a specific column. An orthogonal array is so arranged that, for each level in one column, each level in another column appears the same number of times. For example, when applying it to the case where there are about ten failure lots, a small scale two level L12 orthogonal array from among a plurality of orthogonal arrays is stored in the orthogonal array database 19.

The identification module 8 identifies a manufacturing tool causing a failure common to a plurality of failure lots. Then, the list generating module 9 transfers list information on a tool causing a failure. Therefore, the user terminal 2, a main memory unit 11, a program storage unit 12 for identifying the tool causing a failure, a factorial effect database 28, and a fault cause list database 25 are connected to the CPU 10. The main memory unit 11 stores the process history information on the plurality of manufacturing tool groups 3a, 3b, 3c . . . 3q . . . which are associated with the lot identification information, and the test results on the plurality of substrates 27a, 27b, 27c, 27d . . . . The user terminal 2 can display the failure cause list information and the like. Furthermore, an instruction from a user can be inputted via the user terminal 2. In the program storage unit 12 for identifying a tool causing a failure, a program for executing a method which identifies a tool causing a failure is stored using a system for identifying a tool causing a failure according to the first embodiment of the present invention. In the factorial effect database 28, factorial effect data generated by the data generating module 5 are stored. The fault cause list database 25 stores a list of tools causing a failure created by the list generating module 9.

Before going into a method for identifying a tool causing a failure according to the first embodiment of the present invention, a method is described below according to which a tool-difference analysis is performed using the system as shown in FIG. 1 to select a failure lot.

Figures 2, 3:
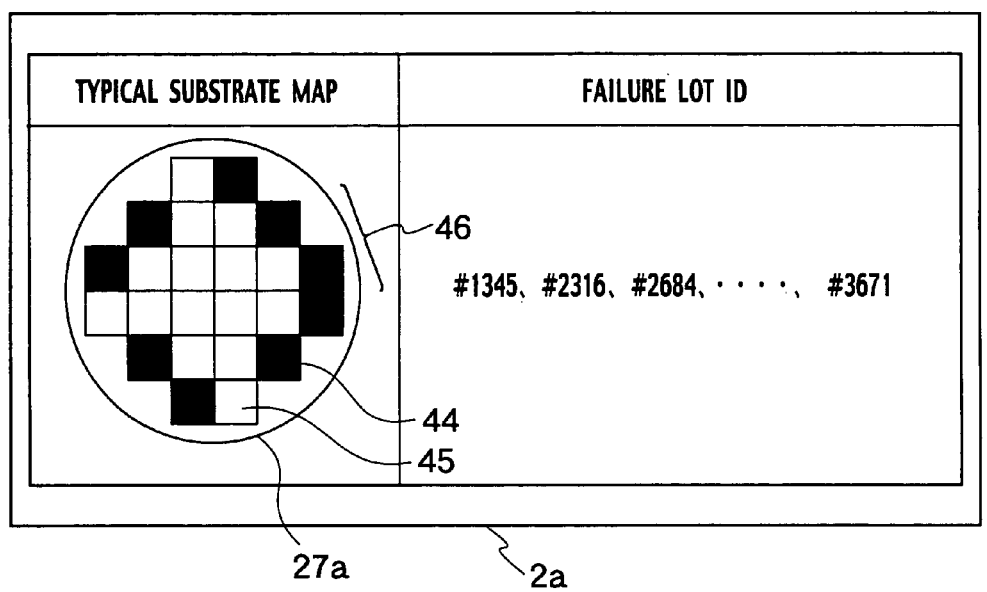
FIG. 2 is a schematic diagram showing a fault classification result, generated by the system for identifying a manufacturing tool causing fault according to the first embodiment.
FIG. 3 is a schematic diagram showing the results of a tool-difference analysis for a periphery fault, generated by the system for identifying a manufacturing tool causing fault according to the first embodiment.

FIG. 2 shows an example of a display showing a tendency within a substrate surface of a failure lot that is extracted by the extraction module 22 on a display 2a at the user terminal 2. FIG. 2 shows, as an example, a failure lot identification number (ID) for a lot where there is a periphery failure, and a pattern 46 for a plurality of failure unit regions. As to the pattern 46 for a plurality of failure unit regions shown on a field for a typical substrate map, a portion marked with color on a substrate 27a represents a failure unit region 44. A portion marked with white represents a pass unit region 45. A failure lot identification number (ID) for a lot extracted by the extraction module 22 is displayed in a field for failure lot ID as a failure lot which has a tendency for failures (failure pattern) within a surface of a substrate where failures represented by the failure unit region 44 are concentrated along the periphery of the substrate. FIG. 2 shows an example where ten lots in total are extracted as failure lots having the same tendencies for failures within the substrate surfaces, the ten lots being denoted as failure lot identification number "#1345," failure lot identification number "#2316," failure lot identification number "#2684," . . . failure lot identification number "#3671."

The estimation module 23 is to identify tools by performing a tool-difference analysis from among the manufacturing tool groups 3a, 3b, 3c . . . 3q . . . , the tools each causing a periphery failure lot group where, as shown in FIG. 2, failures are concentrated along the periphery of a substrate. For example, research may be carried out using a chi-square test for deviation on the number of processes of failure lots within the manufacturing tool groups 3a, 3b, 3c . . . 3q . . . while referring to the manufacturing tool history information, by making use of lot identification information (or identification number) as to lots processed respectively by the manufacturing tool groups 3a, 3b, 3c . . . 3q . . . and failure lot identification information (or identification number) for the periphery failure lot, during a research period of one month or one week. Then, the estimation module 23 estimates a failure lot group based on the deviation for the number of processes of failure lots.

The data generating module 5 generates factorial effect data based on information on the failure lot group estimated by the estimation module 23. For example, in the process q, when the manufacturing tool group 3q consisting of N manufacturing tools is used, the manufacturing tools are respectively defined as "Mq1, Mq2 . . . MqN" (N: an integer equal to or greater than 1). Total number A of processed lots by the manufacturing tool group 3q consisting of N manufacturing tools is calculated using Eq. (1). In Eq. (1), the respective numbers of lots processed by the manufacturing tool group 3q consisting of N manufacturing tools during the research period are defined as "aq1, Aq2 . . . AqN."

$$A = Aq1 + Aq2 + \ldots + AqN \tag{1}$$

The data generating module 5 defines the numbers of failure lots for the manufacturing tools Mq1, Mq2 . . . MqN consisting of N manufacturing tools as "Fq1, Fq2 . . . FqN," respectively. The data generating module 5 calculates the processed total number F of failure lots in the process q using Eq. (2).

$$F = Fq1 + Fq2 + \ldots + FqN \tag{2}$$

The data generating module 5 calculates the expectation value Eqi for every manufacturing tool Mqi of the number of processed failure lots, and obtains the expectation value of the number of failure lots caused by the manufacturing tools Mq1, Mq2 . . . MqN using Eq. (3).

$$Eqi = F * Aqi / A \tag{3}$$

The respective expectation values of the number of processed failure lots calculated using Eq. (3) for the respective N manufacturing tools Mq1, Mq2 . . . MqN are defined as "Eq1, Eq2 . . . EqN." The numerator in Eq. (3) is the multiplication of the processed total number F of failure lots and the number of processed lots Aqi for every manufacturing tool Mqi (i=1 to N). The denominator in Eq. (3) is the total number of processed lots A. The expectation value Eqi of each manufacturing tool Mqi for the processed number of failure lots is calculated, and the expectation value of the number of failure lots caused by the manufacturing tools Mq1, Mq2 . . . MqN is obtained.

Furthermore, the data generating module 5 calculates the value $\chi qi^2$ (i=1 to N) for the manufacturing tool group 3q for the process q, by using Eq. (4). In this case, Fqi denotes the number of failure lots, and Eqi denotes the expectation value of the number of failure lots caused by the manufacturing tool group 3q.

$$\chi qi^2 = (Fqi - Eqi)^2 / Eqi \tag{4}$$

The data generating module 5 calculates, for example, using Eq. (5), the chi-square value $\chi^2q$ for the process q.

$$\chi^2q = \chi^2q1 + \chi^2q2 + \ldots + \chi^2qN \tag{5}$$

Next, the data generating module 5 defines the chi-square distribution function of the degree of freedom of N as "$f(\chi^2, N)$," and calculates the chi-square test value Pq in the process q using Eq. (6).

$$Pq = f(\chi^2q, N-1) \tag{6}$$

The data generating module 5 determines that there is significant difference in the deviation with respect to a failure lot process with 95% confidence in the process q, when for example the chi-square test value Pq is not more than "0.05."

However, the determination condition for the chi-square test value Pq is not limited to "0.05." For example, the chi-square test value Pq may be detected in the range of less than or equal to "0.01," and a significant difference may be determined in that the manufacturing tool Mqi in the process q is a tool causing a failure lot.

FIG. 3 is an example of a display on the display 2a at the user terminal 2 on which the chi-square test value Pq calculated for each process number is displayed, the value Pq being factorial effect data generated by the data generating module 5. In FIG. 3, the chi-square test values Pqs which are calculated using the above-described Eqs. (1) to (6) in all of the processes for manufacturing semiconductor integrated circuits on the chip region 26 are shown.

FIG. 3 shows the process numbers "126," "76," and "93" corresponding to the top three values for the chi-square test value Pq, and the chi-square test values Pqs "0.13," "0.26," and "0.39" corresponding respectively to the process numbers. Each chi-square test value Pq for the process numbers "126," "76," and "93" is larger than "0.05." Hence, it is determined that it is difficult to identify a manufacturing tool group causing the peripheral failure from among the manufacturing tool groups 3a, 3b, 3c ... 3q ..., based on the test result.

In FIGS. 4A, 4B and 4C, the three typical substrate maps of substrates of 10 lots to which the tool-difference analysis is performed, which are generated by the data generating module 5, are shown.

As for a failure unit region pattern 46a shown in FIG. 4A, nine failures each representing the failure unit region 44 are concentrated along the periphery of the substrate 27b, while fifteen non-failures of the pass unit region 45 exist on regions other than the periphery. As for a failure unit region pattern 46b shown in FIG. 4B, five failures of the failure unit region 44 are concentrated along the right hand periphery of the substrate 27c, while nineteen non-failures of the pass unit region 45 exist on regions other than the right hand periphery. As for a failure unit region pattern 46c as shown in FIG. 4C, five failures of the failure unit region 44 are concentrated along the left hand periphery of the substrate 27d, while nineteen non-failures of the pass unit region 45 exist on the regions other than the left hand periphery.

As described above, in FIGS. 4A, 4B and 4C, a common failure tendency is that the failures are concentrated along the periphery of the substrate. However, in the lot of the substrate 27b shown in FIG. 4A, the failures of the failure unit region 44 occur all along the periphery making a complete circuit, while in the lot of the substrate 27c shown in FIG. 4B, the failures of the failure unit region 44 are distributed unevenly to the right hand side; and in the lot of the substrate 27d shown in FIG. 4C, the failures of the failure unit region 44 are distributed unevenly to the left hand side. Therefore, the failure unit region patterns shown in FIGS. 4B and 4C can be classified as the left/right uneven type.

As described above, there are some small differences in failure tendency within a substrate surface. In some cases, there is a common failure tendency along the periphery of the substrate occurring in the manufacturing tool groups 3a, 3b, 3c ... 3q ... . For example, in the case where the manufacturing tool groups 3a and 3b causing a failure are different in detail in the failure tendency within the substrate surface, in a processing of a tool-difference analysis a plurality of failure causes are processed simultaneously, it can be not be determined not if a significant difference exists between the manufacturing tool group 3a and the manufacturing tool group 3b as to which tool is causing the failure in the failure lots.

Hence, it is necessary to divide the periphery failures of a substrate into smaller failure categories. However, there may be various combinations for dividing a region into smaller failure categories, such that a circuit type periphery failure and other periphery failures are distinguished from each other; and the left type failure and the right type failure are distinguished from each other. A selection determination from among the combinations cannot be made easily.

Next, as a method for optimizing a system of a plurality of factors, using the so-called "Taguchi Method," an example will be described of a factor analysis on a system for identifying a tool causing a failure. The chi-square test value Pq becomes significant for generating a factorial effect chart as the chi-square test value Pq becomes smaller, and a trial is performed while the level of a failure occurrence condition being changed according to, for example, the orthogonal array L12 shown in FIG. 5. Hence an optimum condition can be determined with a minimum number of trials.

In the orthogonal array L12, when the respective 2-level combinations "11," "12," "21" and "22" which are arranged in a certain two columns, appear the same number of times, these two columns are orthogonal to each other, and are combined so as to balance. The data generating module 5 calculates the chi-square test value Pq in the order, in the orthogonal array, starting from trial number "1" in the first row to trial number "12" in the twelfth row, in the combination of the process number and the tool number shown in FIG. 6. The chi-square test value Pq in each trial number is defined as yi(i=1 to 12). When the signal/noise (SN) ratio to the trial number is set as Ki, the SN ratio Ki is calculated using Eq. (7).

$$Ki = -10 \log(yi2) \tag{7}$$

Next, the chart generating module 6 calculates the average of factors for every level with reference to the orthogonal array. For example, when the average for the level "1" where the failure lot is allocated to the factor number column "1" is set as X11, the average X11 of SN ratio at the level "1" for the factor number "1" (in FIG. 6, corresponding to the level of each of the trial numbers from "1" to "6" in the factor number "1") is calculated using Eq. (8).

$$X11 = (K1 + K2 + K3 + K4 + K5 + K6)/6 \tag{8}$$

In the same manner, the chart generating module 6 calculates the average X21 of SN ratio at the level "2" for the factor number "1" (in FIG. 6, corresponding to the level of each of the trial numbers from "7" to "12" in the factor number column "1") using Eq. (9).

$$X21 = (K7 + K8 + K9 + K10 + K11 + K12)/6 \tag{9}$$

The identification module 8 estimates the level "1" as a level where a failure lot exists and estimates the level "2" as a level where a pass lot exists, also with respect to the factor number column x="2" to "12," based on the 2-level orthogonal array L12 shown in FIG. 5. As a consequence, it is possible to respectively calculate SN ratio X1x at the level "1" and SN ratio X2x at the level "2," and to obtain the most significant calculation result in identifying a failure lot which is in balance according to the 2-level orthogonal array.

While there are various sizes for the orthogonal array, in the "L12 orthogonal array" which is displayed on the display 2a as shown in FIG. 5, the trial numbers from "1" to "12" are allocated along the ordinate, and the factor numbers from "1" to "11" are allocated along the abscissa. When handling the substrates of 10 lots, an optimization is performed on "2-level 11 factors" through twelve trials using the "L12 orthogonal array." In the matrix shown in FIG. 5, numeral "1" stands for the level "1," while numeral "2" stands for the level "2." The level "1" and the level "2" are the main effect information arranged on a trail row. For example, each of the factor numbers from "1" to "11," arranged on a factor column, is associated with the main effect information. Here, the factor numbers are associated with a lot which is a group of substrates. When a lot corresponds to the level "1," it is estimated as a failure lot, and when a lot corresponds to the level "2," it is estimated as a pass lot. Each level is arranged to estimate a failure lot and a pass lot so that each factor number column is associated with a lot comprising a plurality of substrates.

The estimation module 23 assumes that there is no substrate lot which can be allocated to the factor number "11," and performs a calculation for a substrate lot as a backup. As for the "L12 orthogonal array," calculation is performed twelve times for the trial numbers from "1" to "12" with respect to the selection of lots.

The estimation module 23 selects a failure lot for every trial number based on the orthogonal array. For example, for the first trial, the level for every factor number is "1," and all periphery failure lots are selected as failure lots. Next, in the second trial, the estimation module 23 performs a calculation with the levels for the factor numbers from "1" to "5" corresponding to the level "1," while performing calculation with the levels for the factor numbers from "6" to "11" corresponding to the level "2." That is, the lots for substrates "1" to "5" are selected as failure lots. In FIG.7A, failure lot identification numbers for trial numbers and factor numbers, which are allocated in the 2-level orthogonal array, are shown. As shown in FIG. 7A, the failure lot identification number "#1345" is allocated to the factor "1"; the failure lot identification number "#2316" is allocated to the factor "2"; the failure lot identification number "#2684" is allocated to the factor "3"; . . . ; and the failure lot identification number "#3671" is allocated to the factor "10."

In the trial number "1" of FIG. 7A, the following lots are selected as failure lots: failure lot identification numbers "#1345," "#2316," "#2684," . . . "#3671" which are allocated to the factors where the level is set to "1" in the orthogonal array.

In the same manner, in the trial number "2," the following lots are selected as failure lots: failure lot identification numbers "#1345," "#2316," "#2684," "#2873," "#2954" which are allocated to the factors where the level is set to "1" in the orthogonal array.

In the same way, in the trial number "12," the following lots are selected as failure lots: failure lot identification numbers "#2684," "#2873," . . . "#3671" which are allocated to the factors where the level is set to "1" in the orthogonal array.

FIG. 7B is an example of a result where a tool-difference analysis is performed by the identification module 8 for each of the trials "1," "2," . . . "12" which are selected based on the "2-level orthogonal array." The identification module 8 outputs results 53a of the tool-difference analysis for the trial number "1" to the list generating module 9. The results 53a of the tool-difference analysis for the trial number "1" show the chi-square test values Pq "0.13," "0.26," "0.39," "0.41," . . . which are calculated so that the values are respectively associated with the tool numbers, the tool numbers "2," "1," "2," "3," . . . being specified so that they are respectively associated with the process numbers "126," "76," "93," "42," . . . displayed in the order from the top row to the bottom row. As for the trial number "1," the periphery failure lots for all the substrates are selected as failure lots. Therefore, the chi-square test values Pq are the same as those in FIG. 3.

In the trial number "2," the results 53b of the tool-difference analysis show the chi-square test values Pq "0.04," "0.11," "0.19," "0.33," . . . which are calculated so that the values are respectively associated with the tool numbers, the tool numbers "2," "4," "2," "1," . . . being specified so that they are respectively associated with the process numbers "93," "214," "126," "76," . . . displayed in the order from the top row to the bottom row. In the trial number "2," the level "2" is set to some factor numbers, which is not the case for the trial number "1" where the level "1" is set to every factor number. Hence, the chi-square test values Pq in the results 53b of the tool-difference analysis are lower than those in the results 53a of the tool-difference analysis.

In the trial number "12," the results 53c of the tool-difference analysis show the chi-square test values Pq "0.02," "0.03," "0.15," "0.18," . . . which are calculated so that the values are respectively associated with the tool numbers, the tool numbers "2," "2," "1," "2," . . . being specified so that they are respectively associated with the process numbers "46," "126," "76," "93," . . . displayed in the order from the top row to the bottom row. In the trial number "12," the selections of failure lots of substrates are made further different compared with those in trial number "2." Hence, the chi-square test values Pq in the results 53c of the tool-difference analysis are lower than those of the results 53a of the tool-difference analysis and of the results 53b of the tool-difference analysis.

FIG. 6 is a table showing a counting result, focusing attention on the extracted tools and processes, as to the chi-square test values Pq of the results obtained by the tool-difference analysis in which the processes and the tools are combined, for the trials "1" to "12." As shown in FIG. 6, as the counting result of the chi-square test values Pq, the process numbers, the tool numbers, and the chi-square test values Pq are indicated. The chi-square test values Pq are those for the trial numbers from "1" to "12." In FIG. 6, the tool numbers "2," "1," "2," "3," . . . are shown in a way that they are respectively associated with the process numbers "126," "76," "93," "42," which are shown in the order from the top row to the bottom row. The calculated results of the chi-square test values Pq "0.13," "0.26," "0.39," "0.41," . . . in the trial number "1" are shown so that the values are respectively associated with the tool numbers. In the same manner, the calculated results on the chi-square test values Pq "0.19," "0.33," "0.04," "1," . . . in the trial number "2" are shown, and the calculated results on the chi-square test values Pq "0.03," "0.15," "0.18," "1," . . . in the trial number "12" are shown, so that these values are respectively associated with the tool numbers.

The chart generating module 6 allocates "1" as the chi-square test value Pq to the trial number in which the process and the tool on which a user focuses attention do not exist, in the counting result of the chi-square test value Pq. For example, since numeral "1" is allocated as the chi-square test value Pq to the trial numbers "2" and "12" for the process number "42," a lower value is calculated for the SN ratio in the "Taguchi Method."

Figure 8:
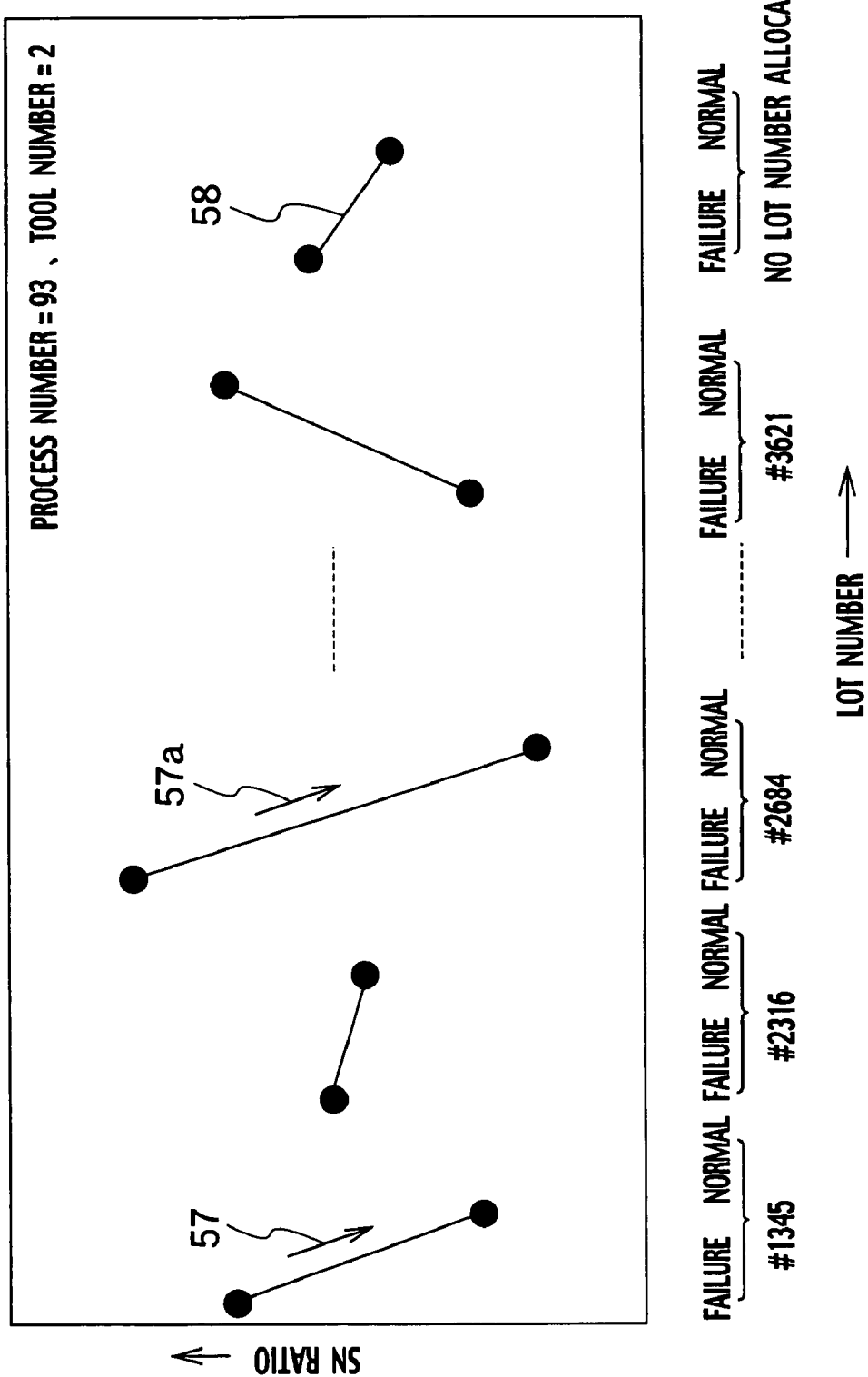
FIG. 8 is a factorial effect chart for test values of tool-difference analyses for failure lot selections used in the first embodiment.

The chart generating module 6 generates a graph where the average values of the SN ratios at the levels "1" and "2" for the factor "i" are joined by lines, and generates, for example, a factorial effect chart as shown in FIG. 8. The factorial effect chart in FIG. 8 is one where the process number is "93," and the tool number is "2." The factorial effect chart thus created is transmitted to the user terminal 2. As shown in FIG. 8, the SN ratio in the factorial effect chart is assigned to the ordinate, and the lot number is assigned to the abscissa. In FIG. 8, the left point at a lot number is the SN ratio at the level "1," and the right point at the lot number is the SN ratio at the level "2." The level which is selected as a failure lot is the level "1," and the level which is selected as a pass lot is the level "2," and, in the factorial effect chart of FIG. 8, the lot where a graph falls to the right is selected as a failure lot, and the SN ratio can be raised.

In FIG. 8, the statement "no lot number allocated" indicates the auxiliary lot 58 where a lot is not allocated to the factor "11," but there is a difference in the SN ratio created between the level "1" and the level "2" for the auxiliary lot 58. This is because, even if a lot number is not allocated, there is intermediate values for the average value X111 of the SN ratio for the level "1" and the average value X211 of the SN ratio for the level "2," and the difference in the SN ratio is an error in an optimization. Therefore, as for the lots which actually exist and which are allocated to the factors from "1" to "10," a lot in which the difference between the SN ratios at the levels "1" and "2" is larger than that when the factor is "11," and which is allocated to the factor where a graph falls to the right, may be selected as a failure lot.

As for the lot number "#1345" in FIG. 8, the average X11 of the SN ratio at the level "1" is higher than the average X21 of the SN ratio at the level "2," and the difference between the average X11 and the average X21 is larger than the difference between the average X111 and the average X211 in the factor "11." Therefore, the lot number "#1345" indicates a failure lot in which a significant difference for identifying a tool for causing a failure is large. As for the lot number "#2316," the average X12 of the SN ratio at the level "1" is higher than the average X22 of the SN ratio at the level "2," but the difference between the average X12 and the average X22 is smaller than that for the case of the factor "11." Therefore, the lot number "#2316" indicates a failure lot in which a significant difference for identifying a tool for causing a failure is small. As for the lot number "#2684," the average X13 of the SN ratio at the level "1" is higher than the average X23 of the SN ratio at the level "2," and the difference between the average X13 the average X23 is larger than that for the factor "11 ." Therefore, the lot number "#2684" indicates a failure lot in which a significant difference for identifying a tool causing a failure is large. The lot number "#3621" indicates a failure lot in which a significant difference for identifying a tool causing a failure is small, since the average X13 of the SN ratio at the level "1" is lower than the average X23 of the SN ratio at the level "2."

According to the above-described results, the selection module 7 selects the abnormal lots 57, 57a as failure lots, the lots 57, 57a corresponding to the lot number "#1345" and the lot number "#2684," respectively.

The identification module 8 performs a tool-difference analysis on the abnormal lots 57, 57a . . . as failure lots, selected by the selection module 7. The identification module 8 extracts the chi-square test value Pq of the failure lot which is processed by the specific processes and tools, and failure lot identification information. A stack map is created through stacking of failure maps of respective failure lots selected by the selection module 7. FIG. 9 is an example created by the list generating module 9, where a calculation result on the tendency of failures within the surface of each substrate causing a failure is displayed in association with a process and a tool, the failure substrate being caused by the process and the tool which processed the abnormal lots 57, 57a . . . due to the same cause for the failure. FIG. 9 shows the chi-square test value Pq and the stack map as the examples of the calculation results.

In the same manner, the chart generating module 6 generates a factorial effect chart for the other processes shown in FIG. 6, that is, a process number 126, a tool number 2, a process number 76, a tool number 1, a process number 42, a tool number 3 . . . and the selection module 7 optimizes failure lot selections. Here, the phrase "to optimize failure lot selections" means to select failure lots whose failure is estimated to be caused by the same tool, from among a failure lot group including failure lots whose failure tendencies within the substrate surfaces are the same with one another. The identification module 8 performs a tool-difference analysis, and the list generating module 9 generates a list of causes for the failure.

The failure unit region pattern 46e , which is defined as a tendency of failures within a substrate surface, indicates the calculation results for the process number "93," and the tool number "2" shown in FIG. 6; the failure unit region pattern 46f indicates the calculation results for the process number "126," and the tool number "2" shown in FIG. 6; and the failure unit region pattern 46g indicates the calculation results for the process number "76," and the tool number "1" shown in FIG. 6.

The list generating module 9 generates and lists, as shown in FIG. 9, a list of tools causing a failure, a result obtained by performing a tool-difference analysis according to a method of selection for a failure lot which is optimized with respect to each process number and each tool number shown in FIG. 6. The failure unit region patterns 46e , 46f, and 46g shown in FIG. 9 clarify that the respective failure lot ID's having been optimized, the process numbers, and the tool numbers having caused a failure are different, and the cause of the failures is mutually different.

As shown in FIG. 9, the list of tools causing a failure shows, in the order from the left to the right, the process number, the tool number, the chi-square test value Pq, the failure lot identification information, and the stack map. It is shown, for example, that with respect to the tool number "2" having processed the process number "93," the chi-square test value Pb of a failure lot, is "0.01," the failure lot identification information is "#1345," "#2684," . . . "#2954" and the failure unit region pattern 46e is shown as a stack map. The failure unit region pattern 46e is composed of the pass unit regions 45 and the failure unit regions 44 which are located along the periphery of the substrate 27e , and which surround the pass unit regions 45. That is, the failure unit region pattern 46e is a circuit type periphery failure pattern.

In FIG. 9, it is shown that the chi-square test value Pq of an abnormal lot caused by the tool number "2" having processed the process number "126" is "0.02," the failure lot identification information is "#2316," "#2719," . . . "#3511" and the failure unit region pattern 46f is the failure unit region pattern. The failure unit region pattern 46f is composed of the pass unit regions 45 on a substrate 27f, and of the failure unit regions 44 which are located at the right hand side of the group of the pass unit regions 45, and at the periphery of the substrate 27f. That is, the failure unit region pattern 46f is a right-lopsided-periphery failure pattern, the failure being lopsided to the right hand side of the periphery.

In the same manner, in FIG. 9, it is shown that the chi-square test value Pq of an abnormal lot caused by the tool number "1" having processed the process number "76" is "0.04," the failure lot identification information is "#3621," "#3688," . . . "#3671," and the failure unit region pattern 46g is the failure unit region pattern. The failure unit region pattern 46g is composed of the pass unit regions 45 on a substrate 27g, and the failure unit regions 44 which are located at the left hand side of the group of the pass unit regions 45, and at the periphery of the substrate 27g. That is, the failure unit region pattern 46g is a left-lopsided-periphery failure pattern, the failure being lopsided to the left hand side of the periphery.

An example as to a method for identifying a tool causing a failure according to the system for identifying a tool causing a failure shown in FIG. 1 will be described hereinafter using a flowchart in FIG. 10.

Figure 10:
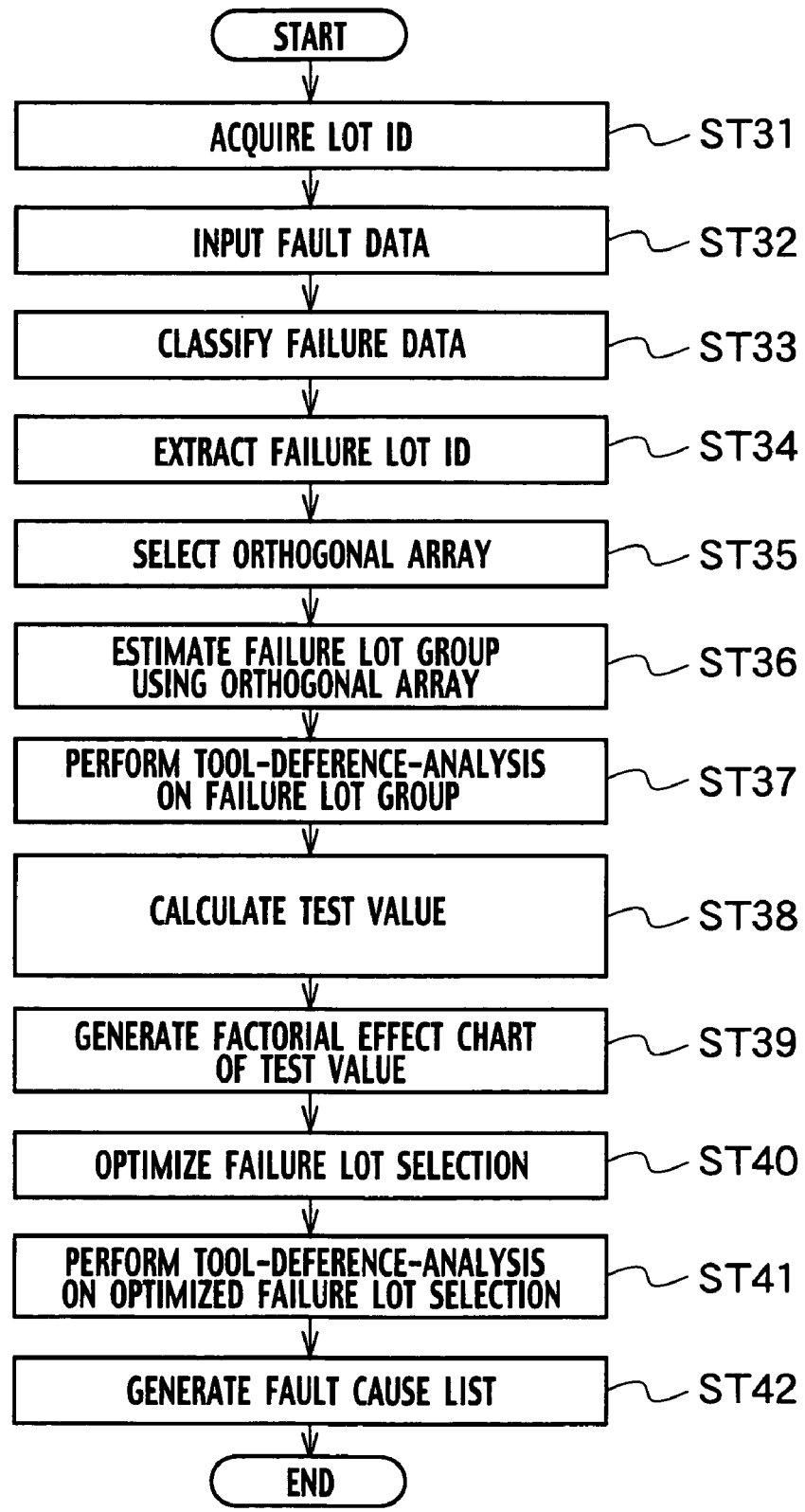
FIG. 10 is a flowchart for describing a method for identifying a manufacturing tool causing fault according to the first embodiment.

In FIG. 10, in Step ST31, the classification module 20 in FIG. 1 acquires, from the lot identification information database 15, the lot identification information for the substrates 27a, 27b, 27c, 27d . . . and the process history information for the plurality of manufacturing tool groups 3a, 3b, 3c . . . 3q . . . , the process history information having been stored in association with the lot identification information.

In Step ST32, the estimation module 23 stores the test results on substrates, and the process history information on the plurality of manufacturing tool groups 3a, 3b, 3c . . . 3q . . . , and the process history information associated with the lot identification information acquired from the fault data database 18.

In Step ST33, the classification module 20 reads the test results on the plurality of substrates 27a, 27b, 27c, 27d . . . and the process history information as to the plurality of manufacturing tool groups 3a, 3b, 3c . . . 3q . . . , the process history information associated with the lot identification information stored in the main memory unit 11. The classification module 20 classifies the fault data based on the tendencies within the substrate surfaces. Failure classification information which differentiates the kinds of the classified fault data and the pass data is stored in the fault classification database 21 in a manner that it is associated with the lot identification information on each substrate.

In Step ST34, the extraction module 22 reads the failure classification information from the fault classification database 21. The extraction module 22 extracts the failure classification information of the test results on the substrates 27a, 27b, 27c, 27d . . . and the process history information as to the plurality of manufacturing tool groups 3a, 3b, 3c . . . 3q . . . , the process history information associated with the lot identification information. The extraction module 22 transmits, to the user terminal 2 and the estimation module 23, the lot identification information thus extracted. The estimation module 23 classifies the lot identification information into typical substrate patterns using the lot identification information of each substrate, and the tendency of failures of the surface of each substrate which is included in the test results. The estimation module 23 transmits, to the data generating module 5, the classified lot identification information and the process history information of the plurality of manufacturing tool groups 3a, 3b, 3c . . . 3q . . . , in a way that the classified lot identification information and the process history information are associated with each other. Here, the estimation module 23 can display the failure unit region patterns caused in a plurality of lots and stored in the fault classification database 21, on a field for a typical substrate map for the display 2a. That is, it is possible to prompt a user to extract the failure lot identification information on failure lots, by displaying, on the user terminal 2, the failure lot identification information on failure lots, each lot having the same failure unit region pattern as the failure unit region pattern displayed on the field for the typical substrate map.

In Step ST35, the estimation module 23 selects data in the 2-level orthogonal array which is applied to the failure lot identification information on extracted failure lots, from the orthogonal array database 19.

In Step ST36, the estimation module 23 estimates a failure lot group using an orthogonal array selected in Step ST35. It is possible to display information on the estimated failure lot group as the failure unit region pattern 46, on the field for the typical substrate map in FIG. 2. As explained in FIG. 2, for example, ten lots in which the tendencies of failures within the surfaces of the substrates are identical to one another are selected as a failure lot group.

In Step ST37, the data generating module 5 performs the tool-difference analysis, and identifies failure tools causing the plurality of patterns of failures due to the same failure cause, from the manufacturing tool groups 3a, 3b, 3c . . . 3q . . . . To be precise, the data generating module 5 performs a chi-square test on the failure lot group using Eq's. (1) to (6), and investigates deviation in failure lot processes.

In Step ST38, the data generating module 5 defines, for example, the chi-square test value Pq shown in FIG. 6 using a calculation method such as the "Taguchi Method". Putting the SN ratio to the trial number shown in FIG. 6 as Ki, the data generating module 5 calculates each SN ratio Ki using Eq. (7). In Eq. (7), the chi-square test value Pq for each trial number shown in FIG. 6 is defined as yi (i=1 to 12).

In Step ST39, the chart generating module 6 calculates averages separately for the level "1" and the level "2" with respect to a plurality of chi-square test values Pq which are calculated in Step ST38, and generates a factorial effect chart as shown in FIG. 8.

In Step ST40, the selection module 7 selects an abnormal lot out of the factorial effect chart. For example, a failure lot selection is optimized by selecting a process of the process "93" as a candidate, the process of the process number "93" causing a failure lot where a failure has a circuit type periphery failure pattern shown in FIG. 9. In addition, a failure lot selection is optimized by selecting a process of the process "126" as a candidate, the process of the process "126" causing a failure lot where a failure has a right-lopsided-periphery failure pattern. Further, a failure lot selection is optimized by selecting a process of the process "76" as a candidate, the process of the process "76" causing a failure lot where a failure has a left-lopsided-periphery failure pattern.

In Step ST41, the identification module 8 performs a tool-difference analysis on a failure lot selection thus optimized. The identification module 8 reads, from the tool database 4, the tool history information of the plurality of manufacturing tool groups 3a, 3b, 3c ... 3q ... having processed, for example, a process of the process number "93," on the basis of information of the factorial effect chart, and analyzes deviation on a failure lot process with the chi-square test. For example, the manufacturing tool group 3b for the tool number "2" where the chi-square test value Pq calculated using Eq's. (1) to (6) is less than or equal to "0.05" is identified as a tool causing a failure. In the same manner, the identification module 8 reads, from the tool database 4, the tool history information on the plurality of manufacturing tool groups 3a, 3b, 3c ... 3q ... having performed the process "126," and analyzes deviation on failure lot processes with the chi-square test. Moreover, the identification module 8 reads, from the tool database 4, the tool history information of the plurality of manufacturing tool groups 3a, 3b, 3c, ... 3q ... having performed the process number "76," and analyzes deviation on failure lot processes with the chi-square test. Further, the manufacturing tool group 3a for the tool number "1" where the chi-square test value Pq calculated using Eqs. (1) to (6) is less than or equal to "0.05" is identified as a tool causing a failure.

In Step ST42, the list generating module 9 generates a failure-causing-tool list that is a list of the failure unit region patterns which are in common with one another, a plurality of data of failure lot identification information causing the failure unit region patterns on a lot, a single process number, a single manufacturing tool group number corresponding to the single process number, and a chi-square test value calculated in Step ST38. The failure-causing-tool list thus generated is stored in the fault cause list database 25. The list generating module 9 performs an operation to display abnormal processes and abnormal tools and tendencies of failures within substrate surfaces so that the abnormal processes, abnormal tools and the failure tendencies are respectively associated with one another. The list generating module 9 makes it possible to display the processes and failure causing tools are different from one another, the processes and failure causing tools respectively corresponding to the circuit type periphery failure, the right-lopsided-periphery failure, and the left-lopsided-periphery failure.

In the above, a description has been given for the case of ten failure lots. When there are more failure lots, a 2-level orthogonal array where the number of factors is greater than that of failure lots may be used. It may be permissible to use pass/fail data for every chip as fault data; fail bitmap information acquired from a memory product, a mixed memory logic device product, and the like.

In the above description, a factorial effect chart is generated by performing an optimization with the smaller-is-better characteristic using the 2-level orthogonal array. It is also possible to perform an optimization with the larger-is-better characteristic, according to the "Taguchi Method", using a significant test value in which the accuracy thereof is higher as the test value becomes larger.

Furthermore, when there is information for every substrate as tool history information, information for every substrate may be stored in the fault data database 18 instead of information for every lot.

As has been described above, in the system for identifying a tool causing failure according to the first embodiment of the present invention, it is possible to optimize a failure lot selection using the smaller-is-better characteristic or the larger-is-better characteristic by the 2-level orthogonal array, and to perform a tool-difference analysis based on the result of a failure lot selection thus optimized. Further, even if a failure lot where a plurality of failure factors are mixed comes up, it is possible to automatically separate the failure factors in the failure lot, and easily identify a process and a causing a failure tool.

(Second Embodiment)

Figure 11:
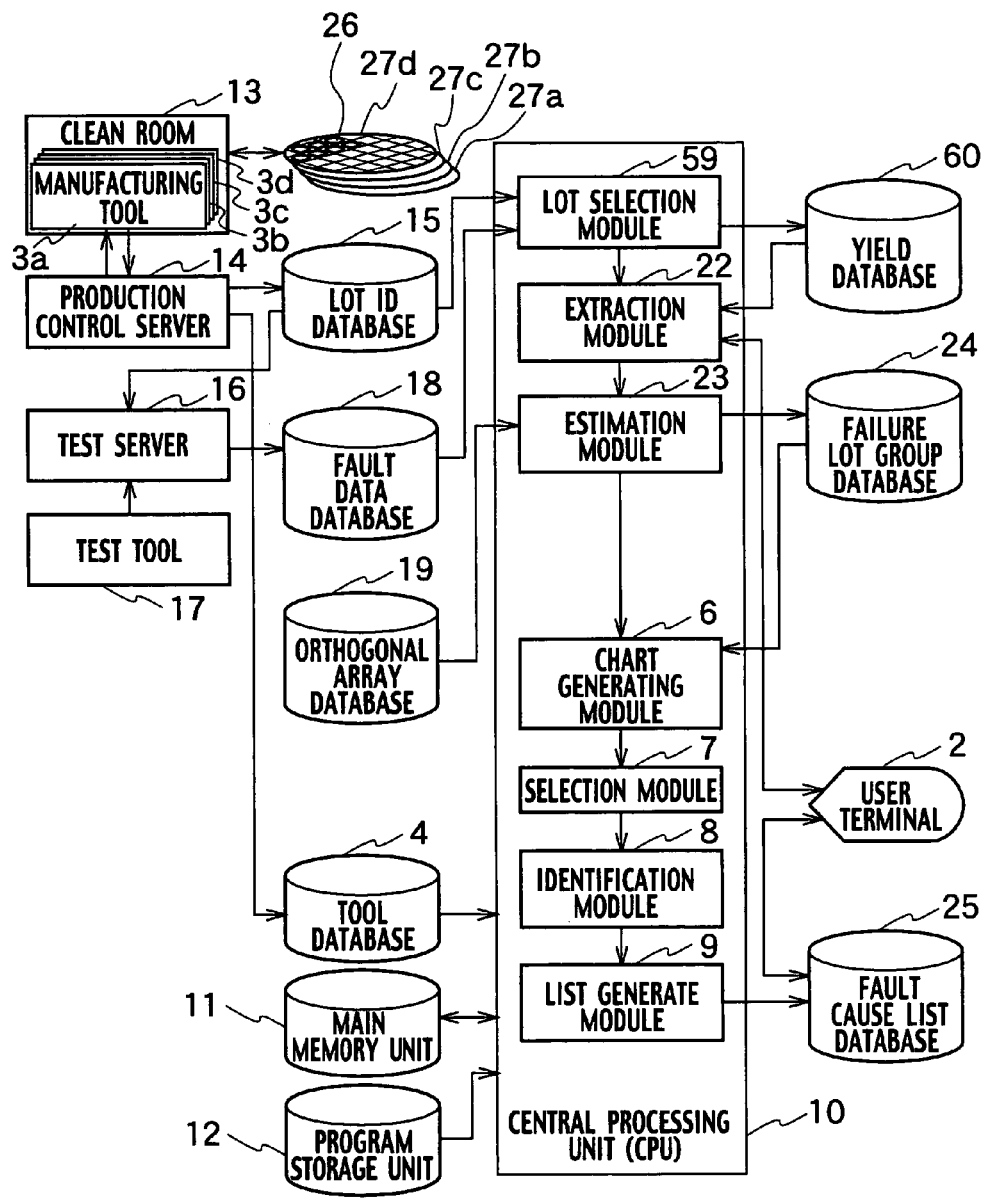
FIG. 11 is a block diagram of a system for identifying a manufacturing tool causing fault according to a second embodiment.

A system for identifying a tool causing a failure according to a second embodiment of the present invention includes, as shown in FIG. 11, a tool database 4, a yield database 60, a failure lot group database 24, a chart generating module 6, a selection module 7, and an identification module 8. The system for identifying a tool causing a failure shown in FIG. 11 is different from the system shown in FIG. 1 in that the former, i.e. the system in FIG. 11, includes the yield database 60 where the yield information on industrial products is stored, and a CPU 10 includes a lot selection module 59. The tool database 4 stores the maintenance information and the operation information of a plurality of manufacturing tool groups.

The yield database 60 stores the yield information on industrial products. The failure lot group database 24 stores information on the failure lot group which is estimated based on the test values of a tool-difference analysis calculated using an orthogonal array where a factor column contains the failure lot identification information in the yield information stored in the yield database, and a trial row contains main effect information for performing estimation of an optimum condition so that it is associated with the factor column.

The chart generating module 6 generates a factorial effect chart using the failure lot identification information and the failure lot group information included in the failure lot group database. The selection module 7 selects, from the failure lot group information, a plurality of failure lots caused by the same reason for the failure, based on the factorial effect chart. The identification module 8 identifies a manufacturing tool used as a common tool for all of the plurality of failure lots thus selected, based on the history information of a manufacturing tool group included in the tool database 4. A tool-difference analysis test value is calculated by an estimation module 23. That is, the estimation module 23 calculates the tool-difference analysis test value using the orthogonal array. Thus, the estimation module 23 estimates a failure lot group based on the calculated tool-difference analysis test value. The information on the estimated failure lot group is stored in the failure lot group database 24.

The second embodiment is different from the first embodiment in that lots where the yields are low are extracted as a group of failure lots. A description on the elements in common with those in the first embodiment will be omitted.

The lot selection module 59 reads lot identification information of a substrate from a lot identification information database 15, and reads fault data corresponding to the lot identification information from a fault data database 18. The lot selection module 59 sets an arbitrary threshold (e.g. the standard value "79" in FIG. 13), and selects lot information on a yield which is less than or equal to the threshold, as a failure lot. The yield information on the failure lot thus selected is stored in the yield database 60. A lot group of which yield information is stored in the yield database 60 may be defined as a low yield lot group. Failure lot identification information is extracted from the yield information stored in the yield database 60. An arbitrary threshold may be set by a user at a user terminal 2. The distributions of frequencies as to all the lots during a period may be counted, and a lot of which the yield is lower than or equal to three times the standard deviation from the center of the deviation, for example, may be selected as a low yield lot group. In the first embodiment, a complex process is required using a classification of the failure tendencies of surfaces for the failure unit region patterns, to select a failure lot group. However, the second embodiment is advantageous in that designating of a failure lot is simplified.

A method for identifying a manufacturing tool responsible for a failure according to the system shown in FIG. 11 will be described hereinbelow using the flowchart in FIG. 12.

Figure 12:
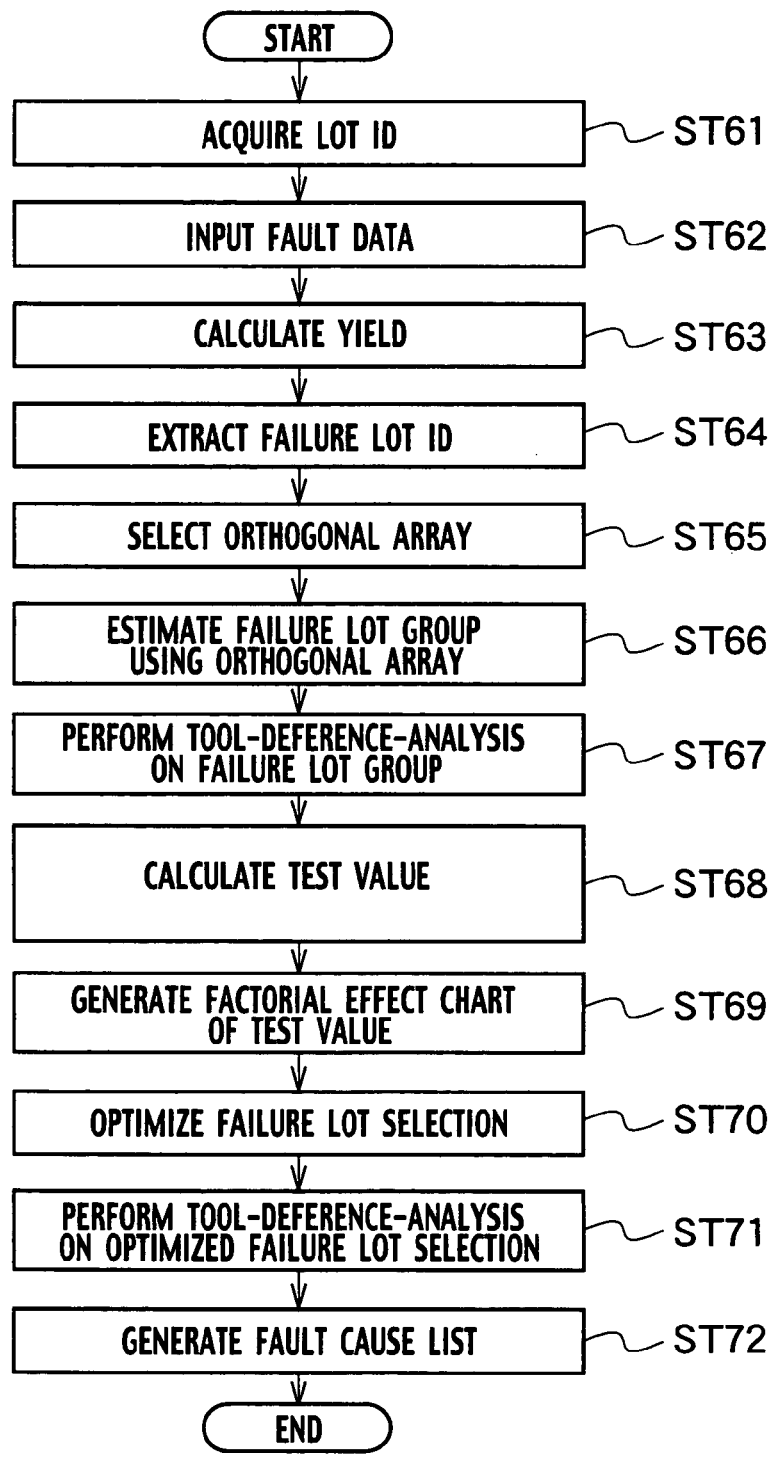
FIG. 12 is a flowchart of the system for identifying a manufacturing tool causing fault according to the second embodiment.

In Step ST61 shown in FIG. 12, the lot selection module 59 shown in FIG. 11 acquires, from the lot identification information database 15, the lot identification information on substrates 27*a* , 27*b* , 27*c* , 27*d* . . . and process history information of manufacturing tool groups 3*a* , 3*b* , 3*c* . . . 3*q* . . . stored in a way that they are respectively associated with the lot identification information.

In Step ST62, the estimation module 23 acquires the test result and the process history information on a substrate which is associated with lot identification information, from the fault data database 18.

In Step ST63, the lot selection module 59 calculates a yield based on the process history information of the plurality of substrates 27*a* , 27*b* , 27*c* , 27*d* . . . and the test result of a test tool 17, on the basis of the lot identification information. The calculating result is stored in the yield database 60 as yield data.

In Step ST64, an extraction module 22 extracts, from the yield database 60, the failure lot identification information corresponding to the failure lot where the yield is less than or equal to an arbitrary threshold. The failure lot identification information thus extracted is displayed on a display 2*a* of the user terminal 2. The user terminal 2 accesses the yield database 60 to display failure unit region patterns created in a plurality of lots on a field for a typical substrate, and prompts a user to extract the failure lot identification information.

In Step ST65, the estimation module 23 selects data in the 2-level orthogonal array corresponding to the extracted failure lot identification information, from an orthogonal array database 19. Further, in Step ST66, the estimation module 23 estimates a failure lot group using an orthogonal array selected in Step ST65, and performs a tool-difference analysis using the orthogonal array in Step ST67.

In Step ST68, the chart generating module 6 reads, from the tool database 4, the history information of the manufacturing tool groups 3*a* , 3*b* , 3*c* , 3*d* . Further, the chart generating module 6 calculates the test value of a process for an abnormal candidate or a tool for an abnormal candidate for a failure lot group. The test value is calculated on the basis of the information on the failure lot group, using an orthogonal array where a factor column contains the maintenance information and the operation information of the plurality of manufacturing tool groups, and a trial row contains the main effect information for performing estimation of an optimum condition in a way that it is associated with the factor column. In Step ST69, the chart generating module 6 generates a factorial effect chart based on the test value calculated in Step ST68.

In Step ST70, the selection module 7 selects an abnormal lot shown by a graph falling to the right in the factorial effect chart, and thereby optimizes a candidate of a process causing a low yield.

In Step ST71, the identification module 8 performs a tool-difference analysis on an optimized failure lot selection method, and performs a tool-difference analysis based on the tool history information of the process number, the tool number, and the like where a failure lot has been created.

In Step ST72, a list generating module 9 generates a failure-causing-tool list on the failure unit region patterns which are in common with one another, a plurality of data of failure lot identification information on a lot causing the failure unit region patterns, a single process number, a single tool number corresponding to the single process number, and a test value calculated in Step ST68 for a test value calculation. The failure-causing-tool list thus generated is stored in a fault cause list database 25.

Figures 13, 14A, 14B:
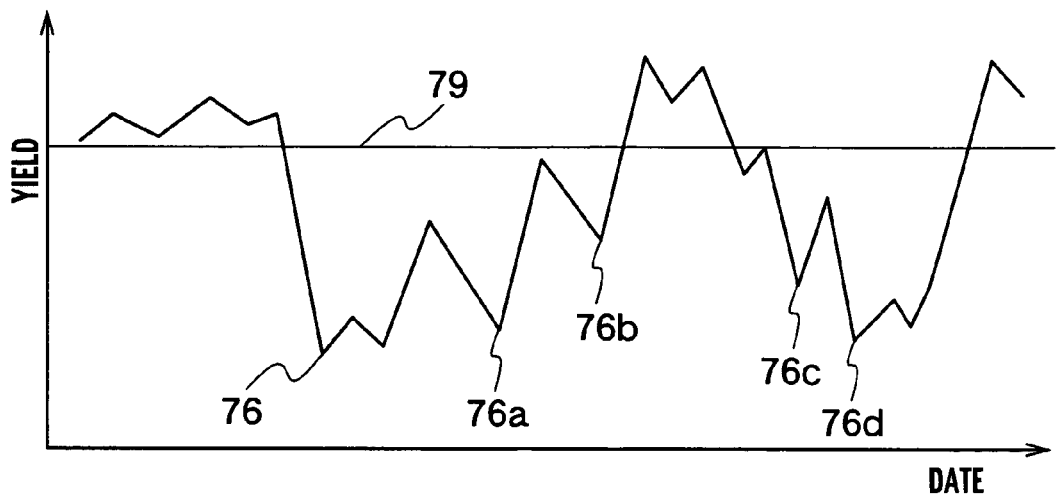
FIG. 13 is a schematic diagram showing a yield trend chart and a determination standard value for a low yield lot according to the second embodiment.
FIG. 14A is a schematic diagram showing a list of low yield lot identification information extracted by the system for identifying a manufacturing tool causing fault according to the second embodiment.
FIG. 14B is a schematic diagram showing an example where failure lot identification information is allocated to factors in an orthogonal array by the system for identifying a manufacturing tool causing fault according to the second embodiment.

FIG. 13 is a figure showing changes in yield for every lot for semiconductor products produced on a manufacturing line. In FIG. 13, the ordinate indicates the yield of semiconductor products, while the abscissa indicates the expenditure date of lots. In FIG. 13, the yields for semiconductor products are generally shown to be high, but in some cases are shown to be low, such as abnormal values 76, 76*a*, 76*b*, 76*c*, and 76*d* . There are various reasons for the low yields of semiconductor products. Hence, it is difficult to obtain a significant result, even if a tool-difference analysis is performed on a yield within which various reasons for failures exist. In the second embodiment as has been described above, a lot where the yield is low is extracted as one of a group of failure lots, and thereby it is possible to identify a tool causing the failure. A specific example will be described below.

The extraction module 22 sets an arbitrary standard value "79," and extracts a lot, as a failure lot, where the yield is less than or equal to the standard value "79". The group of lots where the yields are low is differentiated from the other group of lots, as a low yield lot group. The standard value "79" may be set by the extraction module 22, or may be set arbitrarily by a user. The distributions of frequencies as to all the lots during a period may be counted, and the standard value "79" may be set so that a lot having a yield lower than or equal to three times the standard deviation from the center of the deviation is defined as a low yield lot group.

That is, with only the standard value "79" being set, extracting a failure lot is easily performed. FIG. 14A is an example displayed on the display 2*a* showing the lot identification information on the low yield lot group extracted by the extraction module 22. In the display 2*a*, the lot numbers "#5423," "#5562," "#5872," and "#8724," for example, are displayed in the ascending order, as low yield lot identification information, from the top row to the bottom row.

The estimation module 23 selects, from an orthogonal array database 19, a 2-level orthogonal array where the number of factors is greater than the number of lots for the extracted low yield lot group. For example, an "L16 orthogonal array" where the number of factors is fifteen and the number of trials is sixteen can be adopted. The estimation module 23 allocates each lot of the low yield lot group to a factor, defines the level "1" as a failure lot, defines the level "2" as a pass lot, and allocates failure lot identification information to a factor corresponding to each trial number of the orthogonal array. FIG. 14B shows an example where the failure lots are allocated to the trial numbers. FIG. 14B is an example in which the failure lot identification information with respect to the factors from "1" to "15", respectively allocated to the trial numbers "1" to "12", are displayed on the display 2*a* at the user terminal 2.

For example, the failure lot identification number "#5423" is allocated to the factor number "1," the failure lot identification number "#5562" is allocated to the factor number "2," the failure lot identification number "#5872" is allocated to the factor number "3," . . . , the failure lot identification number "#8724" is allocated to the factor number "14." In the trial number "1" of FIG. 14B, the failure lot identification numbers "#5423," "#5562," "#5872," . . . "#8724", which are allocated to the factors where the level in the orthogonal array is "1", are selected as failure lots.

In the trial number "2," the failure lot identification numbers "#5423," "#5562," "#5872," "#5963," "#6163", which are allocated to the factors where the level in the orthogonal array is "1", are selected as failure lots. In the same manner, in the trial number "16," the failure lot identification numbers "#6324," "#6642," . . . "#8724", which are allocated to the factors where the level in the orthogonal array is "1", are selected as failure lots.

The list generating module 9 generates, as shown in FIG. 15, a process number and a tool number of an abnormal lot, a chi-square test value Pq of the abnormal lot, failure lot identification information, and a stack map for a selected failure lot, and outputs the process number, the tool number, the chi-square test value Pq, the failure lot identification information, and the stack map in the form of a fault cause list.

In the low yield lot groups of FIG. 14A and FIG. 14B, as shown in FIG. 15, there are three reasons for failures. The three failures are a failure unit region pattern 46h where the failure unit regions 44 are concentrated in the center of a substrate 27h, a failure unit region pattern 46i where the failure unit regions 44 appear along the three rows apart from one another, and a failure unit region pattern. 46j where the failure unit regions 44 appear lower left. A lot selection method is automatically optimized according to the kind of failure.

For example, the failure lot identification information included in the chi-square test value Pq "0.00" of an abnormal lot caused by the tool number "4" that processed the first process number "103" indicates lots "#5562," "#5872," and "#5998." As shown in the stack map field in FIG. 15, these lots have the failure unit region pattern 46h. The failure unit regions 44 are concentrated in the center of the substrate 27h, and the pass unit regions 45 surround the failure unit regions 44. Further, the failure lot identification information included in the chi-square test value Pq "0.01" of an abnormal lot caused by the tool number "1" that processed the second process number "46" indicates lots "#5423," "#5724," and "#7213," all have the type of failure unit region pattern 46i where the failure unit regions appear on the three rows. In the same way, the failure lot identification information included in the chi-square test value Pq "0.03" of an abnormal lot caused by the tool number "6" that processed the third process number "197" indicates lots "#6327," "#6953," and "#8724," all have the type of failure unit region pattern 46j.

As described above, according to the system for identifying a tool causing a failure in the second embodiment, a criterion for a low yield can arbitrarily be set. For example, when all of the lots are selected, only a lot group having some failure can be automatically selected so that a lot with a high yield is excluded from the low yield lots, in the case where a factorial effect chart is read and it is determined that the lot has no contribution to the average of the SN ratios to a chi-square test value for a failure. That is, it is possible to extract a low yield or arbitrary lot without classifying the failure tendencies of the surfaces of substrates. Further, even if a plurality of failures is mixed, it is possible to automatically separate the failure lot groups and the pass lot groups, and to automatically identify a process and a tool causing the failure, by optimizing a lot selection method with a 2-level orthogonal array.

(Other Embodiments)

As for the descriptions given above for the first and second embodiments, the examples have been given only to the manufacturing tool groups for manufacturing semiconductor products. However, it would be easy to understand from the above descriptions that the present invention can be applied to the manufacturing methods for various industrial products, when the methods sequentially use, according to predetermined steps, a plurality of manufacturing tool groups for the manufacturing methods of liquid crystal panels, magnetic storage media, optical storage media, pickup portions for thin-film magnetic heads, and superconductivity elements.

Various modifications will become possible for those skilled in the art after receiving the teachings of the present disclosure without departing from the scope thereof.

What is claimed is:

1. A system connected to a plurality of manufacturing tool groups comprising a plurality of manufacturing tools and a test tool testing an industrial product manufactured by the plurality of manufacturing tool groups, for identifying a manufacturing tool causing a failure in the industrial product, comprising:

a data generating module configured to generate factorial effect data, based on information on a failure lot group, which is estimated based on failure lot identification information obtained by the test tool, by using an orthogonal array in which a factor column contains maintenance information and operation information as to the plurality of manufacturing tool groups, and in which a trial row specifies main effect information by every combination of levels in the factor column;

a chart generating module configured to generate a factorial effect chart based on the factorial effect data;

a selection module configured to select a plurality of failure lots caused by the same reason for the failure in the industrial product from among the failure lot group, based on the factorial effect chart;

an identification module configured to identify one of the plurality of manufacturing tools used as a common tool for the selected plurality of failure lots, based on history information of one of the plurality of manufacturing tool groups; and a display configured to display the manufacturing tool causing a failure in the industrial product at a user terminal.

2. The system of claim 1, wherein the main effect information is information for discriminating between a pass lot and a failure lot.

3. The system of claim 1, wherein the failure lot group is a group of failure lots having failure tendencies within the surfaces of substrates, the failure tendencies being the same with one another.

4. The system of claim 1, wherein the factorial effect data indicate a test value for each process.

5. The system of claim 4, wherein the factorial effect chart shows the test value in a separated form of a failure test value and a normal test value for every lot number included in the failure lot group.

6. The system of claim 1, wherein the identification module identifies a manufacturing tool used as a common tool for the selected plurality of failure lots, by a tool-difference analysis.

7. The system of claim 1, further comprising an estimation module configured to estimate the failure lot group, by using an orthogonal array where a factor column contains the failure lot identification information, and where a trial row contains main effect information for estimating an optimum condition in association with the factor column.

8. The system of claim 1, further comprising a classification module configured to classify fault data for a lot, based on failure tendencies within surfaces of substrates.

9. The system of claim 1, further comprising an extraction module configured to extract a lot that satisfies a designated condition.

10. A system connected to a plurality of manufacturing tool groups comprising a plurality of manufacturing tools and a test tool testing an industrial product manufactured by the plurality of manufacturing tool groups, for identifying a manufacturing tool causing a failure in the industrial product, comprising:
   a tool database configured to store maintenance information and operation information of the plurality of manufacturing tool groups;
   a yield database configured to store yield information on the industrial product, which is calculated based on a test result of the test tool;
   a failure lot group database configured to store information on a failure lot group estimated based on a test value of a tool-difference analysis calculated using an orthogonal array, in which a factor column contains failure lot identification information included in yield information stored in the yield database, and in which a trial row specifies main effect information by every combination of levels in the factor column
   a chart generating module configured to generate a factorial effect chart by using the failure lot identification information and failure lot group information stored in the failure lot group database;
   a selection module configured to select a plurality of failure lots caused by the same reason for the failure in the industrial product from among the failure lot group information, based on the factorial effect chart;
   an identification module configured to identify one of the plurality of manufacturing tools used as a common tool for the selected plurality of failure lots, based on history information of one of the plurality of manufacturing tool groups stored in the tool history information database; and
   a display configured to display the manufacturing tool causing a failure in the industrial product at a user terminal.

11. The system of claim 10, further comprising a lot selection module configured to select a failure lot.

12. The system of claim 10, further comprising an estimation module configured to estimate a failure lot group, based on a test value of the tool-difference analysis calculated using the orthogonal array.

13. The system of claim 10, further comprising an extraction module configured to extract a failure lot, which satisfies a designated condition, from the yield database.

14. A computer implemented method for identifying a manufacturing tool causing a failure in an industrial product manufactured by a plurality of manufacturing tool groups comprising a plurality of manufacturing tools, the method comprising:
   testing the industrial product by a test tool;
   generating factorial effect data, based on information on a failure lot group, which is estimated based on failure lot identification information obtained by the test tool, by using an orthogonal array in which a factor column contains maintenance information and operation information as to the plurality of manufacturing tool groups, and in which a trial row specifies main effect information by every combination of levels in the factor column;
   generating a factorial effect chart based on the factorial effect data;
   selecting a plurality of failure lots caused by the same reason for the failure in the industrial product from among the failure lot group, based on the factorial effect chart;
   identifying one of the plurality of manufacturing tools used as a common tool for the selected plurality of failure lots, based on history information of one of the plurality of manufacturing tool groups; and displaying the manufacturing tool causing a failure in the industrial product on a display at a user terminal.

15. The method of claim 14, wherein the main effect information is information for discriminating between a pass lot and a failure lot.

16. The method of claim 14, wherein the failure lot group is estimated using an orthogonal array where a factor column contains the failure lot identification information, and where a trial row contains main effect information for estimating an optimum condition in association with the factor column.

17. The method of claim 14, wherein the failure lot group is a group of failure lots having failure tendencies within the surfaces of substrates, the failure tendencies being the same with one another.

18. The method of claim 14, wherein the factorial effect data indicate a test value for each process.

19. The method of claim 18, wherein the factorial effect chart shows the test value in a separated form of a failure test value and a normal test value for every lot number included in the failure lot group.

* * * * *